United States Patent
Kokuzian et al.

(10) Patent No.: US 6,290,290 B1
(45) Date of Patent: Sep. 18, 2001

(54) INFANT CAR SEAT SUPPORT ASSEMBLY

(76) Inventors: Peter B. Kokuzian; Michelle E. Kokuzian, both of 821 Abbey Dr., Glen Ellyn, IL (US) 60137

(*) Notice: Subject to any disclaimer, the term of this patent is extended or adjusted under 35 U.S.C. 154(b) by 0 days.

(21) Appl. No.: 09/519,752

(22) Filed: Mar. 6, 2000

(51) Int. Cl.$^7$ ........................................ A47D 1/10
(52) U.S. Cl. .................. 297/130; 297/256.16; 248/164
(58) Field of Search ................ 297/130, 250.1, 297/256.16, 440.22; 248/164, 432; 108/118, 119

(56) References Cited

U.S. PATENT DOCUMENTS

| | | |
|---|---|---|
| D. 398,785 | 9/1998 | Pogue et al. . |
| 701,901 * | 6/1902 | Lewis ........................ 248/164 |
| 3,502,291 * | 3/1970 | Ackerman et al. ........... 248/164 X |
| 4,065,175 * | 12/1977 | Perego ........................ 297/130 |
| 4,967,672 | 11/1990 | Leather . |
| 5,146,635 * | 9/1992 | Gastle et al. ............... 248/164 X |
| 5,248,181 | 9/1993 | Efthimiou . |
| 5,364,137 * | 11/1994 | Shimer ...................... 297/130 X |
| 5,454,575 | 10/1995 | Del Buono . |
| 5,564,778 | 10/1996 | Shimer et al. . |
| 5,660,430 | 8/1997 | Clarke . |
| 5,951,102 * | 9/1999 | Poulson et al. .............. 297/130 |

FOREIGN PATENT DOCUMENTS

| | | | |
|---|---|---|---|
| 559033 * | 7/1957 | (BE) ........................ 297/130 |
| 423573 * | 4/1911 | (FR) ........................ 248/432 |

* cited by examiner

*Primary Examiner*—Peter R. Brown

(57) ABSTRACT

An infant car seat support assembly for securing an infant car seat to a portable support assembly. The infant car seat support assembly includes a pair of support members. Each support member has a pair of legs and a cross member extending between upper ends of the pair of legs. The support members are pivotally coupled to each other in a manner such that the cross members are positioned in a substantially parallel spaced relationship to each other to define an open position. The infant car seat support assembly also has at least one brace member that has opposite ends. Each end of the brace member is couplable to a respective one of the cross members for holding the support members in the open position. One of the cross members is designed to securely engage an infant car seat clip, whereby the infant car seat support assembly can be securely engaged to the infant car seat.

15 Claims, 3 Drawing Sheets

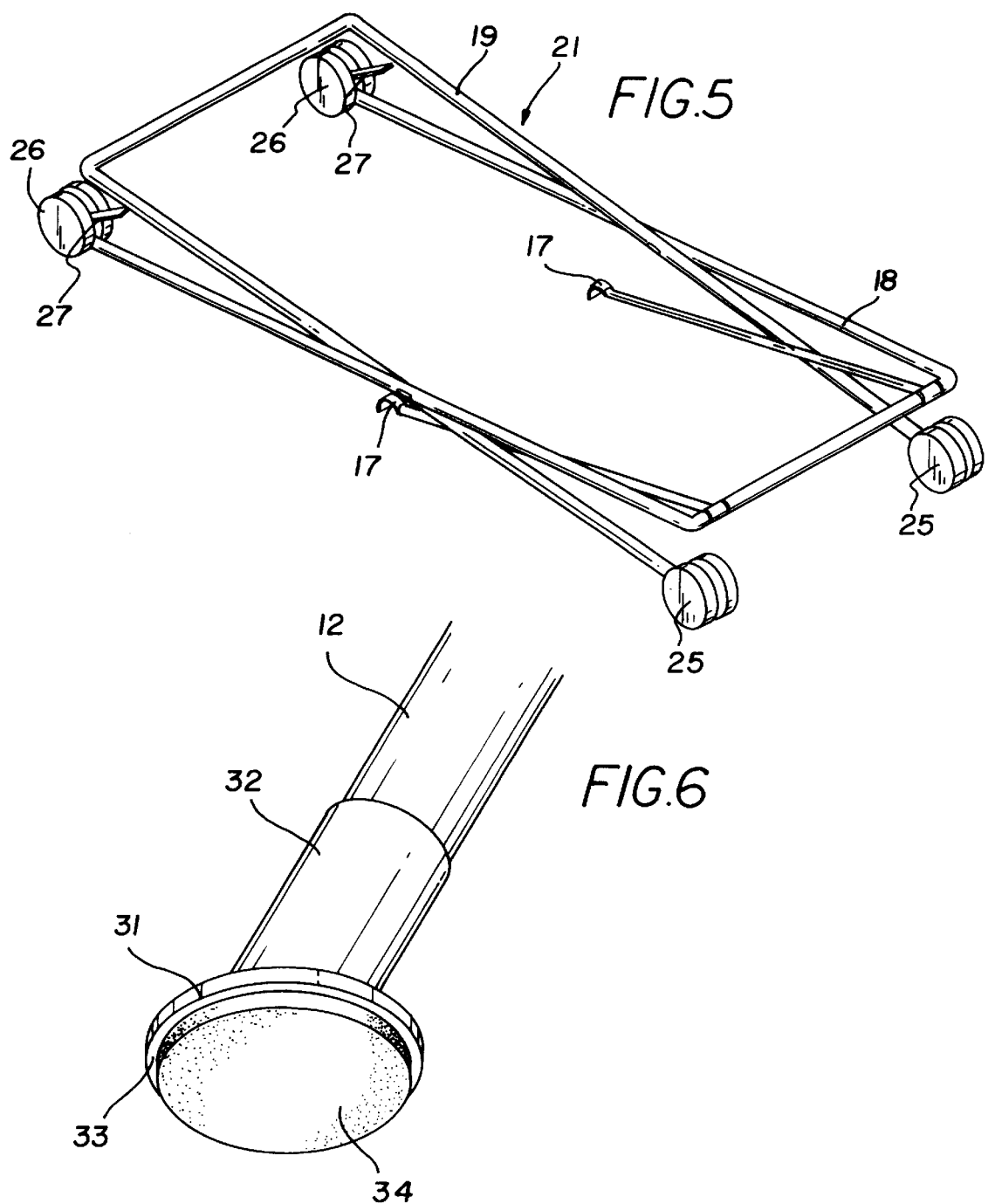

INFANT CAR SEAT SUPPORT ASSEMBLY

BACKGROUND OF THE INVENTION

1. Field of the Invention

The present invention relates to devices that hold infant car seats and more particularly pertains to a new infant car seat support assembly for securing an infant car seat to a portable support assembly.

2. Description of the Prior Art

The use of devices that hold infant car seats is known in the prior art. More specifically, devices that hold infant car seats heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,454,575; 5,564,778; 5,248,181; 5,660,430; 4,967,672; and U.S. Pat. No. Des. 398,785.

While these devices fulfill their respective, particular objectives and requirements, the aforementioned patents do not disclose a new infant car seat support assembly. The inventive device includes a pair of support members. Each support member has a pair of legs and a cross member extending between upper ends of the pair of legs. The support members are pivotally coupled to each other in a manner such that the cross members are positioned in a substantially parallel spaced relationship to each other to define an open position. The infant car seat support assembly also has at least one brace member that has opposite ends. Each end of the brace member is couplable to a respective one of the cross members for holding the support members in the open position. One of the cross members is designed to securely engage an infant car seat clip, whereby the infant car seat support assembly can be securely engaged to the infant car seat.

In these respects, the infant car seat support assembly according to the present invention substantially departs from the conventional concepts and designs of the prior art, and in so doing provides an apparatus primarily developed for the purpose of securing an infant car seat to a portable support assembly.

SUMMARY OF THE INVENTION

In view of the foregoing disadvantages inherent in the known types of devices that hold infant car seats now present in the prior art, the present invention provides a new infant car seat support assembly construction wherein the same can be utilized for securing an infant car seat to a portable support assembly.

The general purpose of the present invention, which will be described subsequently in greater detail, is to provide a new infant car seat support assembly apparatus and method which has many of the advantages of the devices that hold infant car seats mentioned heretofore and many novel features that result in a new infant car seat support assembly that is not anticipated, rendered obvious, suggested, or even implied by any of the prior art devices that hold infant car seats, either alone or in any combination thereof.

To attain this, the present invention generally comprises a pair of support members. Each support member has a pair of legs and a cross member extending between upper ends of the pair of legs. The support members are pivotally coupled to each other in a manner such that the cross members are positioned in a substantially parallel spaced relationship to each other to define an open position. The infant car seat support assembly also has at least one brace member that has opposite ends. Each end of the brace member is couplable to a respective one of the cross members for holding the support members in the open position. One of the cross members is designed to securely engage an infant car seat clip, whereby the infant car seat support assembly can be securely engaged to the infant car seat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new infant car seat support assembly apparatus and method which has many of the advantages of the devices that hold infant car seats mentioned heretofore and many novel features that result in a new infant car seat support assembly which is not anticipated, rendered obvious, suggested, or even implied by any of the prior art devices that hold infant car seats, either alone or in any combination thereof.

It is another object of the present invention to provide a new infant car seat support assembly that may be easily and efficiently manufactured and marketed.

It is a further object of the present invention to provide a new infant car seat support assembly that is of a durable and reliable construction.

An even further object of the present invention is to provide a new infant car seat support assembly which is susceptible of a low cost of manufacture with regard to both materials and labor, and which accordingly is then susceptible of low prices of sale to the consuming public, thereby making such infant car seat support assembly economically available to the buying public.

Still yet another object of the present invention is to provide a new infant car seat support assembly which provides in the apparatuses and methods of the prior art some of the advantages thereof, while simultaneously overcoming some of the disadvantages normally associated therewith.

Still another object of the present invention is to provide a new infant car seat support assembly for securing an infant car seat to a portable support assembly.

Yet another object of the present invention is to provide a new infant car seat support assembly which includes a pair of support members. Each support member has a pair of legs and a cross member extending between upper ends of the pair of legs. The support members are pivotally coupled to each other in a manner such that the cross members are positioned in a substantially parallel spaced relationship to each other to define an open position. The infant car seat support assembly also has at least one brace member that has opposite ends. Each end of the brace member is couplable to a respective one of the cross members for holding the support members in the open position. One of the cross members is designed to securely engage an infant car seat clip, whereby the infant car seat support assembly can be securely engaged to the infant car seat.

Still yet another object of the present invention is to provide a new infant car seat support assembly that may be used in restaurants, hotels, banquet facilities, hair salons and similar facilities.

Even still another object of the present invention is to provide a new infant car seat support assembly that can be used on a standard infant car seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic perspective view of the present invention, illustrating the infant car support assembly being in the stored position FIG. 6 is a schematic perspective view of the present invention, illustrating the foot design.

DESCRIPTION OF THE PREFERRED EMBODIMENT

Figure 1:
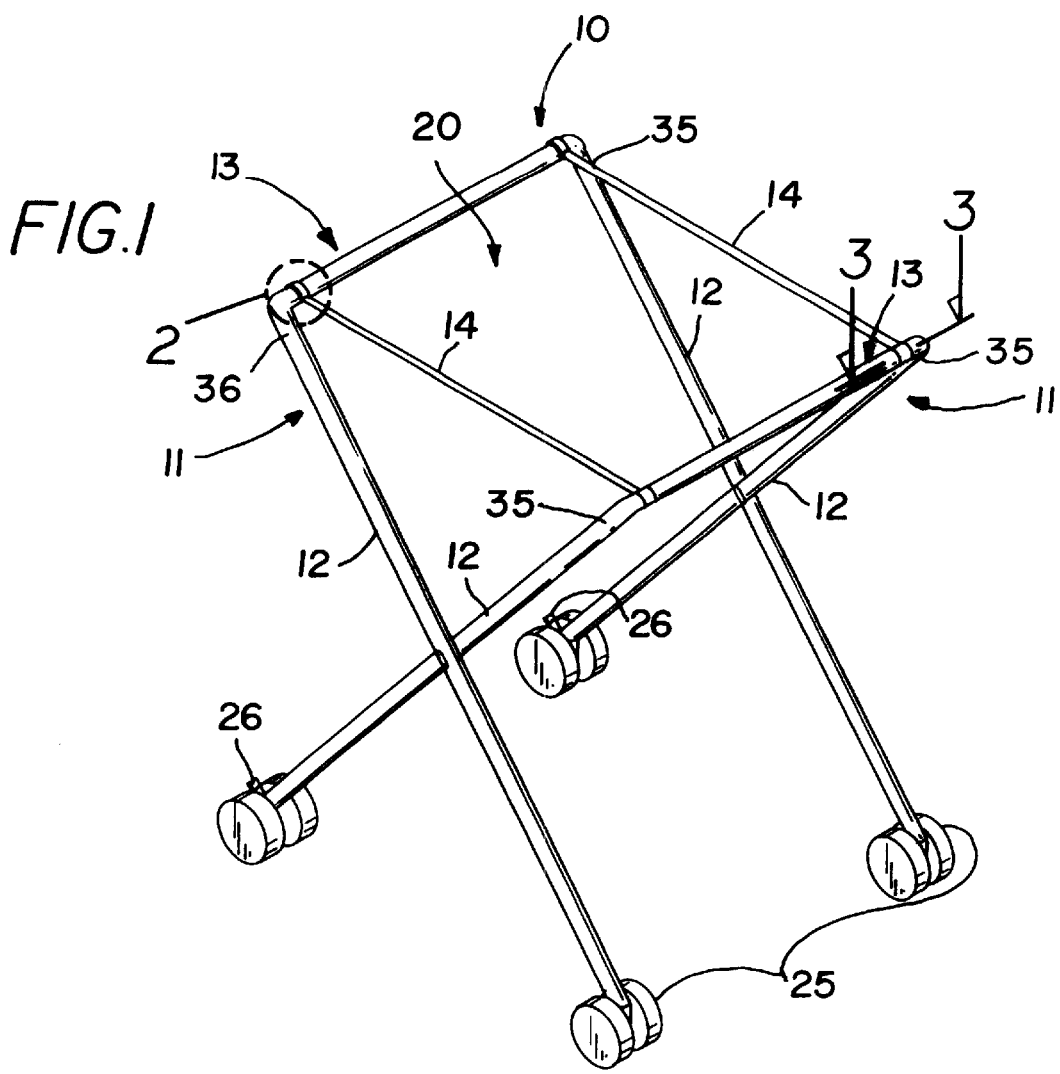
FIG. 1 is a schematic perspective view of a new infant car seat support assembly, illustrating the open position, according to the present invention.
Figure 2:
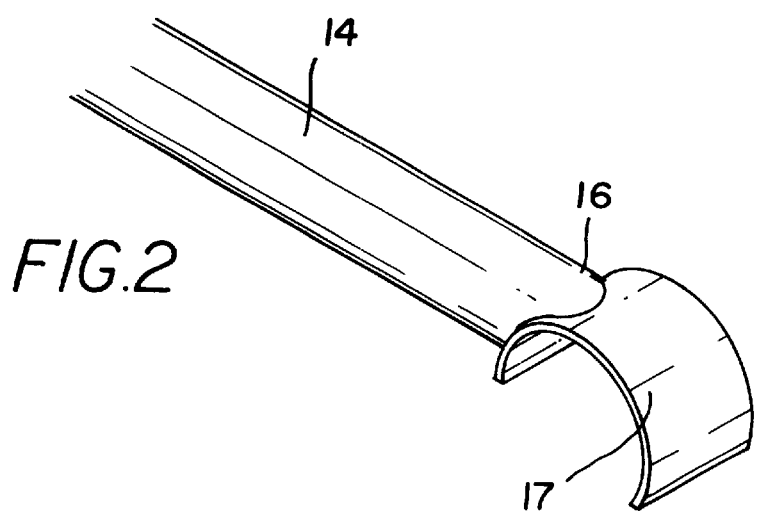
FIG. 2 is a schematic perspective view of the present invention, illustrating the clip member of the second end of each brace member.
Figure 3:
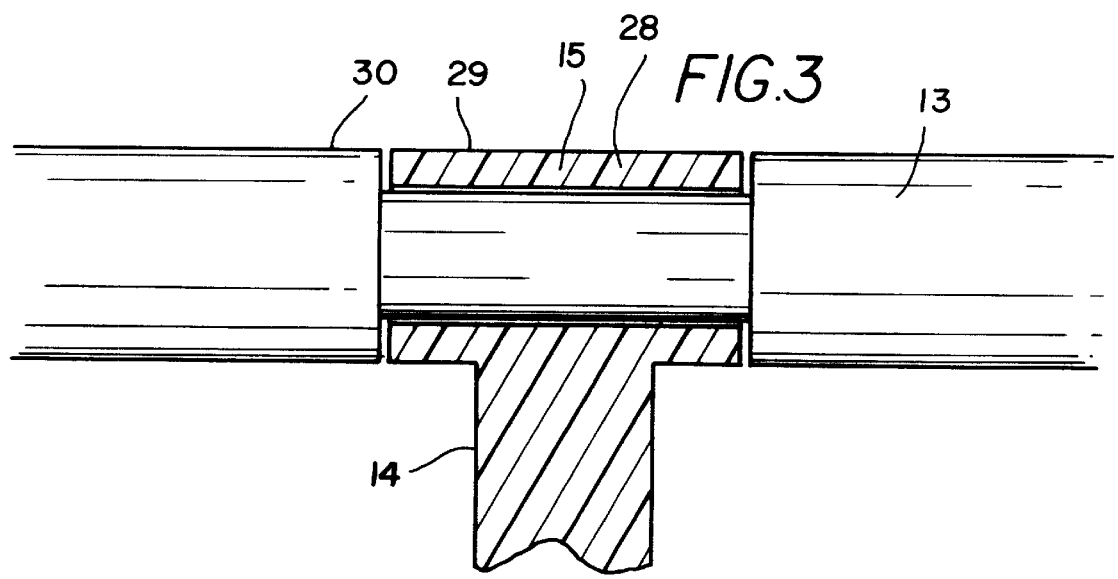
FIG. 3 is a schematic cross sectional view of the present invention, illustrating how the first end of the brace member is hingably coupled to a cross member.

With reference now to the drawings, and in particular to FIGS. 1 through 6 thereof, a new infant car seat support assembly embodying the principles and concepts of the present invention and generally designated by the reference numeral 10 will be described.

As best illustrated in FIGS. 1 through 6, the infant car seat support assembly 10 generally comprises a pair of support members 11. Each of the support members 11 has a pair of legs 12 and a respective cross member 13. The cross members 13 extend between upper ends 35 of the pair of legs 12. The support members 11 are pivotally coupled to each other in a manner such that the cross members 13 are positioned in a substantially parallel spaced relationship to each other.

The infant car seat support assembly 10 also has a pair of brace members 14. Each brace member 14 has a first end 15 and a second end 16. The first end 15 of each brace member 14 is hingably coupled to the cross member 13 of a first one 18 of said support members 11. The second end 16 of each brace member 14 has a clip member 17. The clip member 17 may be engaged to the cross member 13 of a second one 19 of the support members 11. When each of the clip members 17 are engaged with the cross member 13 of the second one 19 of the support members 11, the cross members 13 are held in a substantially parallel spaced relationship to each other to define an open position 20 (see FIG. 1). When the clip members 17 are not engaged with the cross member 13 of the second one 19 of the support members 11, the infant car seat assembly is in a stored position 21 (see FIG. 5).

Figure 4:
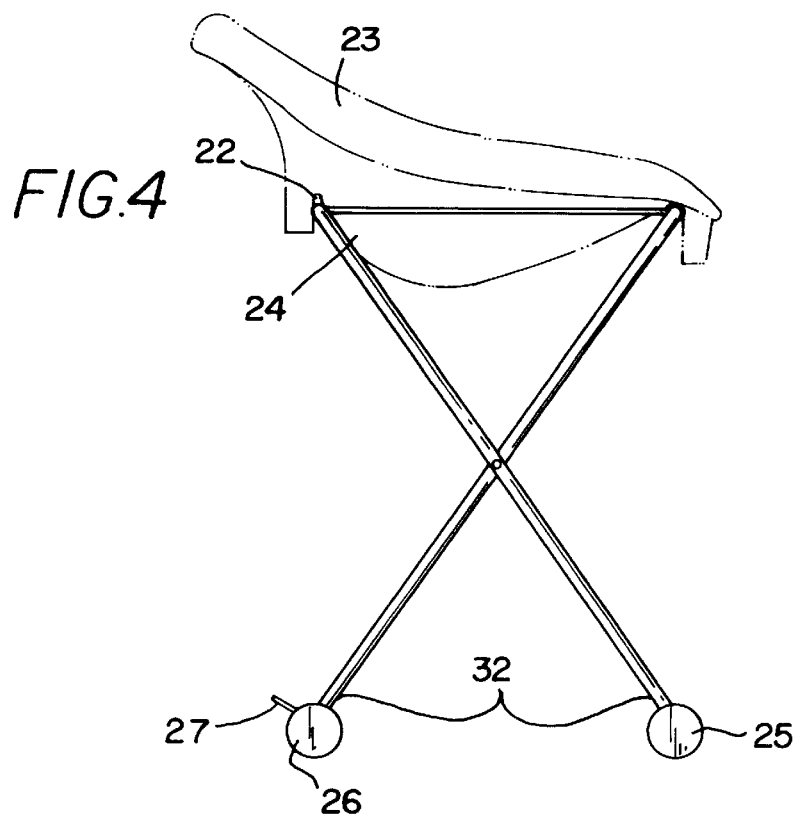
FIG. 4 is a schematic side view of the present invention, illustrating how a standard infant seat is engaged to the infant car seat support assembly.

The cross members 13 are designed to hold a standard infant car seat 23 when the infant car seat assembly 11 is in the open position 20 (see FIG. 4). At least one of the cross members 13 is designed for securely engaging a clip 22 of a infant car seat 23 that is positioned proximate a back 24 of a standard infant car seat 23. When the cross member 13 is engaged with the clip 22 of an infant car seat 23, the infant car seat is secured to 23 the infant car seat support assembly 10.

The infant car seat support assembly 11 may have a plurality of wheels 25. Each wheel 25 is coupled to an associated distal end 32 of a respective one of the legs 12 of the pair of support members 11. In addition, each of the wheels 25 is free to rotate 360 degrees around a substantially vertical axis for facilitating movement of the infant car seat support assembly 10.

The plurality of wheels 25 includes at least two locking wheels 26. Each locking wheel 26 has a locking mechanism 27 for preventing rotation of the locking wheel 26 about a substantially horizontal axis. The locking wheels 26 prevent movement of the infant car support assembly. Each of the locking wheels 26 are coupled to an associated one of said pair of legs 12 of a first one 18 of said support members 11.

If the infant car seat support assembly 10 is not equipped with a plurality of wheels 25, the infant car seat support assembly 10 may be equipped with a plurality of feet 31 (see FIG. 6). Each foot 31 is coupled to an associated distal end 32 of a respective one of the legs 12 of the support members 11. In addition, each foot 31 has a pad of non-skid material 34 coupled to the bottom face 33 of the foot to prevent sliding when the bottom face 33 abuts a supporting surface.

Each first end 15 of said brace members 14 has a generally tubular portion 28 transverse to a longitudinal axis of said brace member 14. A longitudinal axis of each tubular portion 28 is coaxial with a longitudinal axis of the cross member 13 of the first one 18 of the support members 11. An outer surface 29 of each of the tubular portions 28 is substantially flush with an outer surface 30 of the cross member 13 of the first one 18 of the support members 11.

In use, the clip member 17 on the second end 16 of each brace member 14 is engaged with the cross member 13 of the second one 19 of the support members 11, thereby putting the infant car seat support assembly 10 in the open position 20. A standard infant car seat 23 is then placed on top of the infant car seat support assembly 10 and engaged with the cross members 13. One of the cross members 13 is received in the clip 22 of the infant car seat 23, thereby securing the infant car seat 23 to the infant car seat support assembly 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An infant car seat support system comprising:
   an infant car seat having a clip positioned proximate a back of said infant car seat;
   a support assembly having a pair of support members, each support member having a pair of legs and a cross member extending between upper ends of said pair of legs;
   said support members being pivotally coupled to each other such that said cross members are positionable in substantially parallel spaced relationship to each other to define an open position;
   at least one brace member having opposite ends, each end being couplable to a respective one of said cross members for holding said support members in said open position; and
   at least one of said cross members being engageable to said clip positioned proximate said back of said infant car seat whereby said support assembly is securely engaged to said infant car seat.

2. The infant car seat support system of claim 1, further comprising:
   a plurality of wheels, each wheel being coupled to an associated distal end of a respective one of said legs of said pair of support members.

3. The infant car seat support system of claim 2, further comprising:
   each of said wheels being free to rotate 360 degrees around a substantially vertical axis for facilitating movement of said support assembly.

4. The infant car seat support system of claim 2, further comprising:
   said plurality of wheels including at least two locking wheels, each locking wheel having a locking mechanism for preventing rotation of said locking wheel about a substantially horizontal axis for preventing movement of said support assembly.

5. The infant car seat support system of claim 4, further comprising:
   each of said locking wheels being coupled to an associated one of said pair of legs of a first one of said support members.

6. The infant car seat support system of claim 1, further comprising:
   a plurality of feet, each foot being coupled to an associated distal end of a respective one of said legs of said pair of support members.

7. The infant car seat support system of claim 6, further comprising:
   each foot having a pad of non-skid material coupled to a bottom face of said foot for preventing sliding of said bottom face when said bottom face abuts a supporting surface.

8. An infant car seat support system comprising:
   an infant car seat having a clip positioned proximate a back of said infant car seat;
   a support assembly having a pair of support members, each support member having a pair of legs and a respective cross member extending between upper ends of said pair of legs;
   said support members being pivotally coupled to each other such that said cross members are positionable in substantially parallel spaced relationship to each other to define an open position;
   a pair of brace members, each brace member having opposite ends, a first end of each brace member being hingably coupled to said cross member of a first one of said support members, a second end of each brace member having a clip member engageable to said cross member of a second one of said support members whereby said cross members are held in substantially parallel spaced relationship to each other to define an open position; and
   at least one of said cross members engageable to said seat clip positioned proximate said back of said infant car seat whereby said support assembly is securely engaged to said infant car seat.

9. The infant car seat support system of claim 8, further comprising:
   a plurality of wheels, each wheel being coupled to an associated distal end of a respective one of said legs of said pair of support members.

10. The infant car seat support system of claim 9, further comprising:
    each of said wheels being free to rotate 360 degrees around a substantially vertical axis for facilitating movement of said support assembly.

11. The infant car seat support system of claim 9, further comprising:
    said plurality of wheels including at least two locking wheels, each locking wheel having a locking mechanism for preventing rotation of said locking wheel about a substantially horizontal axis for preventing movement of said support assembly.

12. The infant car seat support system of claim 8, further comprising:
    a plurality of feet, each foot being coupled to an associated distal end of a respective one of said legs of said pair of support members.

13. The infant car seat support system of claim 12, further comprising:

each foot having a pad of non-skid material coupled to a bottom face of said foot for preventing sliding of said bottom face when said bottom face abuts a supporting surface.

14. The infant car seat support system of claim 8, further comprising:

each first end of said brace members having a generally tubular portion transverse to a longitudinal axis of said brace member;

a longitudinal axis of each tubular portion being coaxial with a longitudinal axis of said cross member of said first one of said support members; and an outer surface of each of said tubular portions being substantially flush with an outer surface of said cross member of said first one of said support members.

15. An infant car seat support system comprising:

an infant car seat having a clip positioned proximate a back of said infant car seat;

a support assembly having a pair of support members, each support member having a pair of legs and a respective cross member extending between upper ends of said pair of legs;

said support members being pivotally coupled to each other such that said cross members are positionable in substantially parallel spaced relationship to each other to define an open position;

a pair of brace members, each brace member having opposite ends, a first end of each brace member being hingably coupled to said cross member of a first one of said support members, a second end of each brace member having a clip member engageable to said cross member of a second one of said support members whereby said cross members are held in substantially parallel spaced relationship to each other to define an open position;

at least one of said cross members being engageable to said clip positioned proximate said back of said infant car seat whereby said support assembly is securely engaged to said infant car seat;

a plurality of wheels, each wheel being coupled to an associated distal end of a respective one of said legs of said pair of support members;

each of said wheels being free to rotate 360 degrees around a substantially vertical axis for facilitating movement of said support assembly;

said plurality of wheels including at least two locking wheels, each locking wheel having a locking mechanism for preventing rotation of said locking wheel about a substantially horizontal axis for preventing movement of said support assembly;

each of said locking wheels being coupled to an associated one of said pair of legs of a first one of said support members;

each first end of said brace members having a generally tubular portion transverse to a longitudinal axis of said brace member;

a longitudinal axis of each tubular portion being coaxial with a longitudinal axis of said cross member of said first one of said support members; and an outer surface of each of said tubular portions being substantially flush with an outer surface of said cross member of said first one of said support members.

* * * * *